Dec. 8, 1964     R. H. COWLES     3,159,885
SEALING GASKET WITH MAGNET INSERT
Filed Oct. 12, 1961
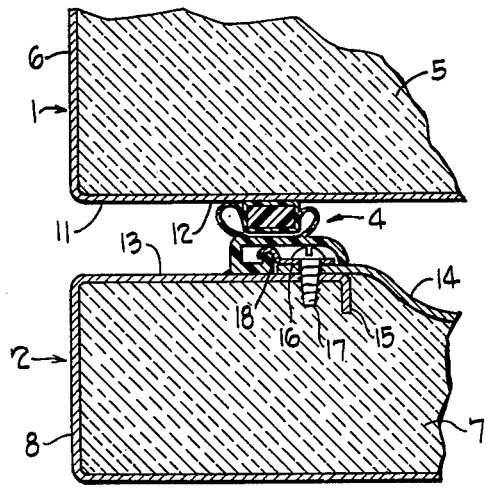
FIG.1
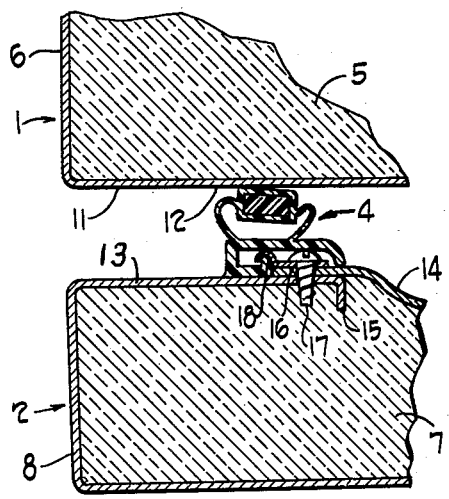
FIG.2
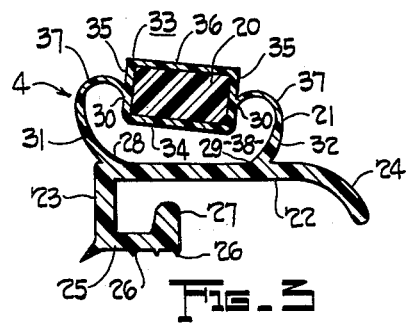
FIG.3     FIG.4
FIG.6     FIG.5
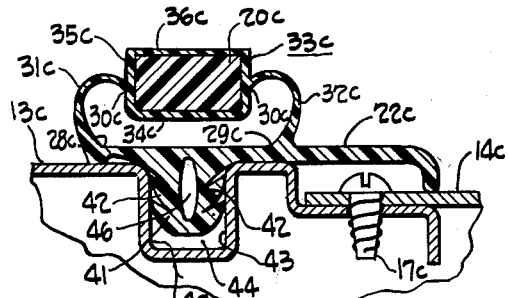
FIG.7
INVENTOR.
RAYMOND H. COWLES
BY Bosworth, Sessions,
Herrstrom and Knowles
ATTORNEYS.

United States Patent Office 3,159,885
Patented Dec. 8, 1964

3,159,885
SEALING GASKET WITH MAGNET INSERT
Raymond H. Cowles, Seymour, Ind., assignor to The H. O. Canfield Company, Inc., Bridgeport, Conn., a corporation of Connecticut
Filed Oct. 12, 1961, Ser. No. 144,794
12 Claims. (Cl. 20—69)

This invention relates to magnetic strip gaskets, and more particularly to gaskets for effecting a compressive seal between two relatively movable members. While gaskets embodying the invention may advantageously be employed for various purposes, they provide exceptional advantages when used in refrigerator cabinets between the doors and the frames. Hence they will be discussed in connection with such use.

For best results, a gasket for this purpose should perform several functions and satisfy several important requirements. It should cushion the door on closing, prevent passage of air through the junction between the door and the cabinet after the door has been closed, and provide heat insulation at such junction. It should perform these functions even if there are irregularities in the surfaces of either or both the door and the cabinet frame at the junction; such irregularities result from ordinary refrigerator manufacturing operations and cannot be avoided without excessive costs.

Moreover, the sealing gasket should provide an effective seal and heat barrier, notwithstanding surface irregularities, despite the fact that when the door is closed and opened the gasket in the vicinity of the hinge is subjected to forces extending transversely of the gasket which tend to impart a wiping action to the gasket. This occurs particularly when the hinge support for the door is one in which the axis of the hinge pivot is substantially offset from the plant of the cabinet surface to be contacted and sealed by the gasket, as is usually the case in modern refrigerators; these transverse forces and the tendency toward the wiping action occur because, as the door approaches its closed position, the offset pivot axis causes the gasket-supporting surface of the door in the vicinity of the hinge to move transversely of the surface of the cabinet against which the gasket is to press. Such transverse movement may approach 50% of the perpendicular movement during the last few degrees of swinging movement of the door on closing. Unless special precautions are taken, as in the gasket of the invention, the sealing wall of the gasket in the vicinity of the hinge will wrinkle or become abraded; its sealing and heat insulation actions will be largely if not completely impaired.

Despite adverse factors such as the above indicated irregularities in the refrigerator surface to be sealed and the transverse movement of the door in the vicinity of the hinged portion of the refrigerator, the gasket should effectively perform its cushioning, sealing and heat insulating functions even under very low sealing pressures. This is because of the need to make modern refrigerators so that they can be opened by a small force exerted on the interior of the refrigerator door, to insure against hazards of children being trapped inside the refrigerator. In addition to all of the above, the gasket should maintain its resiliency, and should rapidly recover its uncompressed shape when the refrigerator door is opened, throughout a long life, so that it can fully perform the above indicated functions for a long period of use without replacement. It is also necessary that the gasket should be capable of manufacture and installation at competitive low costs.

It has been proposed to use gaskets containing magnets or magnetic material to hold the door closed against the cabinet, thus eliminating the need for a separate latch and permitting the refrigerator door to be opened from the inside by exertion of a relatively small force. The use of such a magnetic gasket structure however introduces other problems which must be overcome. It is desirable that the magnetic portion of the structure be flexible and be supported by the gasket so that it is capable of movement relatively to its support in a direction parallel to the direction of movement of the door on opening and closing, to enable the gasket to conform to irregularities in the surface against which it bears, to permit the door to be moved slightly on opening before the gasket is pulled away from the surface against which it is magnetically attracted so that the initial force required to open the door is reduced, and to permit different portions of the gasket to be progressively pulled away from the surface against which they are held by the magnet to reduce the subsequent required opening force. Prior gasket structures permitting such relative movement of the magnetic portion often have the disadvantage that in the horizontal gasket runs above and below the doorway, the portion of the gasket containing the relatively heavy magnetic material sags substantially when the door is opened, so that on closing of the door the gasket may seat imperfectly and thus fail to provide the necessary air sealing and heat insulating functions.

It is an object of the invention to provide a strip gasket of the magnetic type which satisfies the requirements and overcomes all of the problems indicated above. Another object is the provision of a magnetic gasket which is capable of cushioning the closing of a refrigerator door, of making and maintaining an effective seal, and of providing good heat insulation under low sealing pressures. A further object is the provision of such a gasket which eliminates the necessity for a separate latch to hold the refrigerator door closed and which substantially or completely eliminates abrasion or wrinkling of the gasket at the hinged side of the refrigerator cabinet opening.

A further and more specific object is the provision of such a gasket which permits movement of the magnetic portion of the gasket relatively to the base of the gasket sufficient to permit easy opening of the door, but which does not permit the portion of the gasket containing the magnetic material or elements to sag appreciably if at all.

Another object is to provide such a gasket which can be manufactured at low cost and which has excellent resiliency and recovery throughout a long life. These and other objects and advantages of the invention will be apparent to those skilled in the art from the following description and claims and from the drawings in which:

FIGURE 1 is a fragmentary horizontal sectional view of a portion of the handle side of a refrigerator, showing the cabinet, the refrigerator door, and the gasket embodying and representing the best known mode of practicing the invention, the gasket being fixed to the refrigerator door and the door being shown in the closed position;

FIGURE 2 is a fragmentary horizontal sectional elevation, similar to that of FIGURE 1 and to the same scale, showing the same side of the refrigerator in a transient partially opened position and the gasket also in a transient position, barely contacting the sealing surface of the cabinet;

FIGURE 3 is a sectional view to an enlarged scale showing the cross section of the gasket of FIGURES 1 and 2 before installation;

FIGURE 4 is a sectional view, similar to that of FIGURE 3 and to the same scale, showing the cross section of a modified form of gasket embodying the invention;

FIGURE 5 is a sectional view, similar to that of FIGURE 3 and to the same scale, showing the cross section of another modified form of gasket embodying the invention;

FIGURE 6 is a sectional view, to the same scale as FIGURES 3, 4 and 5, showing the cross section of another modified form of refrigerator gasket embodying the invention as mounted on a refrigerator door; and FIGURE 7 is a fragmentary detail showing in normal or unstressed condition the retention portion of the gasket of FIGURE 6.

FIGURES 1, 2 and 3 show somewhat diagrammatically portions of a conventional home refrigerator comprising a cabinet 1 and a door 2 hingedly supported at one edge of the cabinet by conventional hinge means not shown. The door carries a gasket 4 embodying the invention. The refrigerator cabinet 1 is constructed in the usual manner with a thick body 5 of insulating material covered by an outer shell 6 of sheet steel or equivalent magnetic material; the door 2 is similarly constructed in the conventional manner with a thick body 7 of insulating material covered by an outer shell 8 of sheet steel or equivalent magnetic material.

The shell 6 of the cabinet 1 has a flat vertical wall portion 11 extending completely around the door opening to provide a planar sealing surface 12 adapted to be engaged by the gasket 4 in sealing relation, the steel of the shell and the magnetic material of the gasket being mutually attractive to each other. The inner wall of the door shell 8 includes a flat outer peripheral portion 13 and a panel 14 which peripherally overlaps the latter. The wall portion 13 of the door shell 8 is substantially parallel to the wall portion 11 of the cabinet when the door is at its fully closed position, as shown in FIGURE 1. When the door is in this position, there is a relatively wide space between the wall portions 11 and 13 of the cabinet and door, which space may have a horizontal width of ½" or more in a standard size refrigerator.

A stiffening flange 15 on and integral with the portion 13 of the door shell 8 extends into the body of the door and the overlapping edges of the portions 13 and 14 are covered by and carry a sheet metal gasket holding strip 16 which extends entirely around the door opening to hold the gasket 4 in place. The strip 16 is held in place by a series of spaced screws, one of which is shown at 17, which are threaded into and also hold together the overlapping edges of the metal wall portions 13 and 14. The gasket holding strip 16, of uniform cross section, is flat for a major portion of its width, but has a rolled or flanged edge portion 18 of generally arcuate hook-shaped cross section extending outwardly beyond the edge of the wall panel portion 14 for clamping the gasket 4 in place. The rolled edge of the clamping strip provides a channel which receives an edge bead formed integrally on the gasket and locks the latter in predetermined position on and relative to the door, as will appear.

With the exception of the gasket 4, the refrigerator structure described above is conventional. The gasket 4 of the invention, of which the cross section throughout its length is shown enlarged in FIGURE 3, comprises a gasket body portion 21 which carries a magnetic element 20.

The magnetic element 20 shown takes the form of an elongated flexible strip of magnetic material which is continuous in those portions of the gasket along the horizontal top, bottom and the unhinged vertical sides of the door opening. It may also be used in that portion of the gasket along the hinged side of the door in lieu of the foam plastic filler strip customarily used for sake of economy. The magnetic strip 20, which is commercially available, is customarily made by extrusion of a suitable plastic binder or body containing a powdered or ground magnetizable material, the strip being magnetized after formation.

The gasket body 21 is shaped to function effectively and in cooperation with the magnetic strip 20 to satisfy the requirements outlined above. It is made of one of the pliable polymeric materials generally used for refrigerator gaskets, such as homopolymers of vinyl chloride, co- polymers of vinyl chloride and vinyl acetate, polyethylene, polyurethane, or similar extruded materials having the necessary flexibility. Various rubbers and rubbery compositions may also be used. The preferred pliable gasket material is a flexible polyvinyl chloride composition embodying a suitable plasticizer and other compounding ingredients such as pigments, fillers, antioxidants, heat and light stabilizers and the like, as is well known in the art. The plasticizers preferably include a monomeric plasticizer such as dioctylphthalate, dioxthyladipate or the like and/or a polymeric plasticizer such as polyethylene sebacate or the like. As used hereinafter, the term "plastic" when applied to the material of which the gasket is formed is intended to refer to a suitable one of such materials.

The gasket body 21 is formed as by extrusion and solidification of plasticized and compounded polyvinyl chloride, the gasket being shown in FIGURE 3 in its normal unstressed condition prior to being mounted on the door 2. For convenience in description of the structure of this gasket, references to directions will be understood as referring to this figure. The gasket comprises a substantially flat stiff wall or base portion 22 of substantial thickness, having along one edge and normal or at a suitable angle thereto a downwardly extending anchoring section of generally L-shaped cross section and comprising a foot portion 25 and a connecting portion 23. Along its other edge and spaced from the anchoring section, the base portion 22 has a downwardly extending generally inclined sealing flange 24. The outer edge of the latter is generally in alignment with the flat lower foot portion 25 of the anchoring section. This lower foot portion 25 on its underside has several downwardly projecting ribs 26 adapted to bear in line contact sealing relation against the wall portion 13 of the door; it has along its free edge an upwardly projecting relatively thick fastening rib 27 adapted to be clamped by the hook shaped portion 18 of the gasket holding strip 16 to hold firmly the gasket 4 in place on the door, as shown in FIGURES 1 and 2.

The base 22 of the gasket supports two integral spaced upwardly extending walls 31 and 32 which in turn support a portion 33 which carries the magnetic strip 20. This supporting portion 33 takes the form of a longitudinally continuous tube having a closed generally rectangular periphery in cross section comprising a transverse bottom wall 34, upwardly extending side walls 35 integrally fixed to the bottom wall, and a transverse top wall 36 integrally fixed to the upper edges of the side walls 35. The top wall 36 is thinner and more flexible than the bottom wall 34 and the side wall 35 to permit it to adapt itself to irregularities in the surface which it engages in sealing relation.

The side walls 31 and 32 are anchored at their lower edges along spaced parallel juncture lines 28, 29 to the top of the base member 22, and at their distal or upper edges also along parallel juncture lines 30 to the side walls 35 of the tubular magnet supporting portion 33. The juncture lines 30 between the bowed side walls 31, 32 and the magnet tube 33 are located intermediate and spaced from the top and bottom edges of the tube side walls 35, preferably about midway of the latter. The walls 31 and 32 act as springs to support the magnet supporting portion 33 between them, with its bottom spaced substantially from the base 22 when the gasket is in its uncompressed condition as shown in FIGURE 3. These walls yieldingly resist forces tending to move or displace the tubular portion 33 either toward or away from the base member 22 or laterally, and restore the gasket to its original or normal shape when a displacing force is removed.

Although the walls 31 and 32 are thinner and therefore substantially more flexible than the base member 22 and the walls of the tubular portion 33, they are stiff enough to facilitate and achieve these restoring actions, and to prevent objectionable sagging of the portion 33 and its enclosed relatively heavy magnet strip 20 in those horizontally extending runs or lengths of gasket located above and below the refrigerator doorway opening.

Each of the walls 31 and 32 is bowed outwardly, these walls extending upwardly and outwardly from the base member 20 in divergent relation. The upper portion or part 37 of each wall is curved inwardly and downwardly, being substantially semi-cylindrical in shape, so that the upper edges of the walls 31 and 32 joining the associated side walls 35 of the tubular magnet supporting portion 33 along the lines 30 are below the level of the uppermost portions or parts of the cylindrically curved walls 31 and 32. Each of the walls 31 and 32 thus defines a compound curve, the lower portion having a considerably larger radius of curvature than the upper portion; each wall has a smooth substantial curvature throughout its extent, is free of bends and folds which could weaken the wall or promote its distortion in a localized area.

Moreover, as shown in FIGURE 3, each of the bowed walls 31 and 32 preferably is tapered in cross section, having its thickest portion adjacent the juncture line 28 or 29 with the base member 22 and its thinnest portion adjacent the juncture line 30 with the magnet supporting tubular portion 33. The taper is preferably substantially uniform throughout the developed height of each of the walls 31, 32, these tapered, compound curved walls thus acting to provide increasing forces resisting distortion as the magnet holding portion 33 is moved toward or away from the base member 22.

The walls 31 and 32, the base member 22, and the magnet holding portion 33 all cooperate to form an enclosed air chamber 38; in the completed gasket this inner chamber longitudinally continuous throughout the length of the structure, makes possible a dead air space. The confined air aids the walls 31 and 32 in resisting compression or distortion of the gasket and in restoring the gasket to its original shape when the compressive or distorting forces are removed.

When the gasket is mounted on a refrigerator door, it cushions the door on closing due to the action of the spring walls 31 and 32 and the air in the space 38 of the gasket. On closure of the door, the magnet 20 is strongly attracted to the steel surface 12 of the cabinet. The flexibility of the magnet 20 of the wall 36 of the gasket, and of the spring type side walls 31 and 32 of the gasket permit a good seal to be established between the gasket and the surface 12 despite irregularities which may exist on the surface. The air in the space 38 provides excellent heat insulating characteristics across the seal.

The operation of the portions of the gasket on other than the hinged side of the refrigerator door, as the door closes, is illustrated in FIGURES 1 and 2. The tube portion 33 of the gasket first contacts the wall 11, and as the door moves to its completely closed position in which the wall portions 11 and 13 are substantially parallel, the wall 36 of the tube portion 33 firmly seats against the surface 12 of the cabinet, in substantially parallel relation to the base of the gasket, to form an excellent seal, as shown in FIGURE 1. The spring walls 31 and 32 permit necessary inward movement of the tube portion 33.

In the event that in the vicinity of the hinge of the door the gasket is subjected to transverse forces on closing of the door, the gasket nevertheless forms an excellent heat insulating seal. This occurs because the walls 31 and 32 of the gasket are curved and springlike and permit sufficient lateral deformation to occur in the portion of the gasket on the hinged side when the door closes to inhibit, if not entirely prevent, abrasion or objectionable wrinkling which would change the gasket and impair its sealing and heat insulating properties. Thus, as the door closes and the tube portion 33 of the gasket containing the magnet strip 20 initially is drawn into contact with the cabinet surface 12 on the hinged side of the door, such tube portion tends to remain in the same position on the surface 12 as the door closes completely, the lateral flexibility of spring walls 31 and 32 permitting relative transverse movement between the tube portion 33 and the base member 22 of the gasket. The tube portion 33 of the gasket containing the magnetic strip 20 therefore need not twist, tilt or slide.

By reason of the resiliency of the gasket structure in movement of the tube portion 33 both toward and away from the base 22 the gasket prevents release of the door should the door have been slammed shut, so that it tends to rebound from the cabinet. When the door is shut, even rapidly, the movement of the portion 33 relative to the base 22 cushions the action and aids the sealing engagement with the surface 12 of the cabinet due to the action of magnet 20; if the door tends to rebound or swing open, the yielding resistance to distortion provided by the walls 31 and 32 results in the performance of work which rapidly dissipates the kinetic energy of the door, so it is caused to rapidly come to rest.

On opening of the door, a relatively slight pull moves the door a short distance without causing movement or separation from the cabinet of the tube portion 33 of the gasket, the flexibility of the walls 31 and 32 being sufficient to permit them to deform to permit an appreciable amount of movement of the door before they exert sufficient force on the tube portion 33 of the gasket to pull it away from the cabinet surface 12. This movement of the door through a short distance against only the yielding resistance provided by the walls 31 and 32 gives the door momentum and reduces the instantaneous door-opening force to considerably less than would be required if it was necessary to start movement of the door by pulling the magnet strips away from the refrigerator cabinet. As the door opening progresses, the gasket strip on the side of the door remote from the hinged side is first pulled away from the surface 12 of the cabinet; then the tube portions 33 of the substantially horizontal lengths or runs of gasket above and below the opening in the cabinet are progressively pulled away from the surface 12 of the cabinet, beginning at the edge of the door remote from the hinges; the gasket at the hinged side of the door is last pulled away. Consequently at no time is a large force required to open the door; yet when the door is closed an effective heat insulating air seal is provided.

In the embodiment of FIGURES 1–3, the walls 31 and 32 are asymmetrical so that the magnet holding tube member 33 in its unstressed condition is tilted, as shown in FIGURE 2, toward the door opening in the cabinet. Consequently, on closing, the outer corner of the member 33 first contacts the surface 12 and then the rest of the wall 36 of the member 33 is brought into contact with the surface 12 of the cabinet as the door completes its closing. This facilitates proper seating of the wall 36 in that it tends to remove entrapped air between the wall 36 and the surface 12 of the cabinet. This feature, while beneficial, is not essential, however.

FIGURE 4 shows another gasket embodying the invention, differing in several respects from that of FIGURE 3. It comprises a base member 22a having a downwardly extending anchoring portion 23a to which is affixed a flat lower or foot portion 25a. These anchoring and foot portions differ from the anchoring and the foot portions 23 and 25 of the preceding embodiment since the gasket of FIGURE 4 is intended for use with a different type of gasket holding strip.

In the embodiment of FIGURE 4, moreover, there are spaced outwardly bowed spring walls 31a and 32a which at their lower ends are anchored along juncture lines 28a and 29a to the base member 22a and at their upper ends along juncture lines 30a are fixed to and support magnet holding tube portion 33a, which corresponds to the tube portion 33 of FIGURE 3 and has bottom wall 34a, side wall 35a and top wall 36a completely peripherally enclosing flexible magnet strip 20a. The walls 31a, 32a, in conjunction with the base member 22a and the supporting member 33a, define a heat insulating air space 38a similar to the space 38 of the previous embodiment. Wall 31a of the embodiment of FIGURE 4 is similar to the wall 31 of the previous embodiment, but is fast to the anchoring portion 23a along a juncture line 28a at the side of the gasket rather than to the top of the base member; the wall 32a of FIGURE 4 is generally similar to the wall 32 of FIGURE 3. The walls 31a and 32a of the embodiment of FIGURE 4 are compoundly curved, tapered and bowed and operate in a manner similar to the walls 31 and 32 of the previous embodiment. However, the tubular magnet holding portion 33a is not tilted as in the embodiment of FIGURE 3, but is generally parallel to the base member 22a; the portion 33a is, however, provided with an upstanding integral ridge or rib 39a which is soft and yielding at its outer edge and which first makes line contact with the surface 12 of the cabinet on closing and tends to promote the establishment of a good seal between top wall 36a of the gasket and the wall 12 of the cabinet. The gasket of FIGURE 4 operates essentially in the same manner as does the gasket of FIGURE 3, and provides substantially the same advantages.

The gasket shown in FIGURE 5 is similar to those of FIGURES 3 and 4 in that it comprises a base member 22b, spring walls 31b and 32b, which are secured along integral juncture lines 30b to and support an integral tubular magnet-supporting portion 33b containing a flexible continuous magnet strip 20b. In this embodiment the magnet strip 20b and its supporting tube portion 33b are relatively wider than in the previous embodiments. Along the juncture lines 30b side walls 35b are formed on their inside surfaces with integral reinforcing ribs 40 which are received in complemental grooves formed in the side surfaces of the magnet strip 20b. An upstanding cantilever rib 39b is integrally formed with and at the right angle juncture of the walls 35b and 36b of the tubular magnet holding portion 33b; the rib 39b is thus positioned for line contact sealing engagement with the cabinet member which is companion to the one on which the gasket is mounted. The base member 22b to which the bowed walls 31b and 32b are secured integrally along spaced parallel juncture lines 28b and 29b, respectively is also, as shown, of a different configuration in its anchoring portion 23b otherwise the gasket of FIGURE 5 operates similarly to and has similar advantages to those of FIGURES 3 and 4.

The gasket of FIGURE 6 is essentially similar to those previously described, but its base member 22c is designed to be mounted on the refrigerator door differently than in the prior embodiments. The base member 22c includes a downwardly extending integral rib 41 of resilient deformable plastic material. This holding rib has side ridges 42 of saw tooth cross section which, in assembly of the gasket to the refrigerator door, are deformed from their normal or unstressed shape, shown in FIGURE 7, to the stressed shape, shown in FIGURE 6, in which they frictionally engage spaced parallel confronting inner side surfaces 43 of a channel 44 formed in sheet steel wall portion 13c of a refrigerator door. This wall portion 13c is connected to a panel 14c by screws 17c which are concealed by an extending portion of the base member 22c of the gasket. The rib 41 is preferably hollow, with a continuous oval chamber 46.

In the gasket of FIGURE 6 two integral, spaced, compoundly curved, tapered and outwardly bowed spring walls 31c and 32c are anchored at their lower ends and along juncture lines 28c and 29c to the top of the base member 22c, similarly to the anchoring of the walls 31 and 32 of the gasket of FIGURE 3 to the base 22. Walls 31c and 32c resiliently support the magnet holding tubular portion 33c to which they are fast along integral juncture lines 30c, the tubular portion having bottom, side and top walls 34c, 35c and 36c which peripherally enclose a continuous, flexible, rectangular cross sectioned magnet strip 20c. In this embodiment the spring walls 31c and 32c are so formed as to be substantially symmetrical and support the member 33c in substantially parallel relation to the base member 22c. The member 33c thus is not tilted. The gasket of FIGURE 6 operates similarly to the gaskets of FIGURES 3, 4 and 5 with respect to common features and provides essentially the same advantages.

The invention thus provides a gasket of the magnetic type which has excellent air sealing and heat insulating properties. It does not appreciably wrinkle or slide in the vicinity of the hinged side of the cabinet on closing of the door; it can be opened with a small force exerted from either the inside or the outside of the cabinet; it operates satisfactorily despite irregularities in the sealing surface on the cabinet; it does not sag due to the weight of the magnet in the horizontal runs or lengths of the gasket; and it provides compression-resisting forces which absorb the momentum of the door on rebound to bring it rapidly to a halt, thereby stabilizing the opening and closing actions. Its design is such that its unstressed or uncompressed shape is rapidly and automatically restored by inherent resiliency and can be manufactured of gasket materials which do not acquire permanent set over an exceptionally long gasket life. It can be quickly and easily manufactured and installed at competitive low costs.

Those skilled in the art will appreciate that the embodiments shown are for the purposes of explanation and illustration, and that various changes and modifications can be made in the disclosed embodiments without departing from the spirit and scope of the invention. The essential characteristics are described in the appended claims.

What I claim and desire to secure by United States patent is:

1. In a gasket of the type comprising a resilient deformable strip of plastic material for sealing the joint between the frame and door members of a refrigerator cabinet or the like, said strip being of uniform section and comprising in a normal unstressed condition longitudinally extending base and holding portions, said holding portion being spaced above the base portion for relative lateral bodily motion and for bodily motion to and from the base portion and having means for carrying magnetic means to coact with one of the cabinet members, a pair of spaced side walls each extending between the holding and base portions,
the side walls being connected to the base portion along a first pair and to the holding portion along a second pair of spaced parallel juncture lines,
the holding portion having side walls with oppositely directed outside surfaces and
the second pair of juncture lines being located along said outside surfaces,
the side walls being bowed outwardly away from one another with internal concave surfaces facing one another,
each side wall extending from one of the first juncture lines to one of the second juncture lines in a continuous bulging curve externally convex throughout the extent of the side wall,
said first pair of juncture lines being more widely spaced apart than said second pair and portions of the side walls intermediate their respective juncture lines being spaced further apart than said first pair of juncture lines,
whereby under compression between such cabinet members and distention upon separation of such cabinet members the gasket is adapted to yield and distend by easy movements of the holding portion toward and away from the base portion with the bulging curvature of the side walls increasing and decreasing, respectively, and whereby upon lateral movement of one such cabinet member relative to the other with the gasket engaged between, the holding portion is adapted to shift laterally by easy movement relative to the base portion with accompanying rolling motions of the bulging side walls.

2. In a gasket as defined in claim 1 the bulging side walls together constituting the sole support of and for the holding portion on the base portion.

3. A strip gasket of uniform section for sealing the joint between the frame and door members of a refrigerator cabinet or the like, said gasket being made of resilient deformable plastic material and comprising in a normal unstressed condition an elongated base portion, an elongated holding portion adapted to carry magnetic means, and two spaced side walls extending between and fixed to said base portion and said holding portion, the side walls having near edges connected to the base portion along a first pair of spaced parallel juncture lines and having distal edges connected to the holding portion along a second pair of spaced parallel juncture lines, said side walls normally resiliently supporting said holding portion with the latter extending longitudinally of and in spaced relation to said base portion, said side walls providing the only support for said holding portion from said base portion, said side walls having portions adjacent said base portion extending upwardly and outwardly from said first juncture lines in divergent relation and having portions adjacent said holding portion outwardly bowed, said side walls each extending in a continuous curve substantially from one of said first juncture lines to one of said second juncture lines, said side walls having concave surfaces facing inwardly and toward one another on opposite sides of and spaced from said holding portion, said side walls being substantially more flexible than said base portion but sufficiently stiff to resiliently return said holding portion to said spaced relation from said base portion when said sealing strip is released after being depressed toward said base portion in use.

4. A strip gasket as defined in claim 3 in which said walls support said elongated holding portion of said gasket in tilted relation to said base portion, so that elongated magnetic means supported by said holding means is tilted relative to said base portion when the gasket is unstressed.

5. A strip gasket as defined in claim 3 in which in its unstressed condition the projection of the holding portion on the base portion lies wholly between said juncture lines of said side walls and said base portion.

6. A strip gasket of uniform section for sealing the joint between the frame and door members of a refrigerator cabinet or the like, said gasket being made of resilient deformable plastic material and comprising in a normal unstressed condition an elongated base portion, an elongated holding portion adapted to carry magnetic means, and two spaced side walls extending between and fixed to said base portion and said holding portion, the side walls having near edges connected to the base portion along a first pair of spaced parallel juncture lines and having distal edges connected to the holding portion along a second pair of spaced parallel juncture lines, said side walls normally resiliently supporting said holding portion with the latter extending longitudinally of and in spaced relation to said base portion, said side walls providing the only support for said holding portion from said base portion, said side walls each extending substantially from one of said first juncture lines to one of said second juncture lines, said side walls having portions adjacent said holding portion having the shape of continuous curves that have concave surfaces facing inwardly on opposite sides of said holding portion, said distal edges of said side walls being spaced substantially nearer to said base portion than the outermost portions of said side walls, and said side walls being substantially more flexible than said base portion but sufficiently stiff to resiliently return said holding portion to said spaced relation from said base portion when said sealing strip is released after being depressed toward said base portion in use, the outermost portion of said holding means being further from said base portion than the outermost portions of said side walls.

7. A strip gasket as defined in claim 6 in which said holding portion is tubular and of rectangular cross section.

8. A strip gasket of uniform section for sealing the joint between the frame and door members of a refrigerator cabinet or the like, said gasket being made of resilient deformable plastic material and comprising in a normal unstressed condition an elongated base portion, an elongated holding portion adapted to carry magnetic means, and two spaced side walls extending between and fixed to said base portion and said holding portion, the side walls having near edges connected to the base portion along a first pair of spaced parallel juncture lines and having distal edges connected to the holding portion along a second pair of spaced parallel juncture lines, said side walls normally resiliently supporting said holding portion with the latter extending longitudinally of and in spaced relation to said base portion, said side walls providing the only support for said holding portion from said base portion, said side walls having portions adjacent said base portion extending upwardly and outwardly from said first juncture lines in divergent relation and having portions adjacent said holding portion outwardly bowed, said side walls each extending in a continuous compound curve substantially from one of said first juncture lines to one of said second juncture lines, said side walls having concave surfaces facing inwardly and toward one another on opposite sides of and spaced from said holding portion, and said distal edges of said side walls being spaced substantially nearer to said base portion than the outermost portions of said side walls, said side walls being substantially more flexible than said base portion but sufficiently stiff to resiliently return said holding portion to said spaced relation from said base portion when said sealing strip is released after being depressed toward said base portion in use.

9. A gasket as defined in claim 8 in which said holding portion is tubular and of rectangular cross section and comprises substantially flat bottom, side and top walls and in which said last mentioned side walls are each delineated by parallel inside and outside edge corners and the distal edges of the side walls of the strip gasket are joined to said holding portion side walls at locations intermediate and spaced from both the inside and outside edge corners of their respective holding portion side walls.

10. A strip gasket as defined in claim 8 in which the holding portion is tubular and includes an integral longitudinally upstanding cantilever rib positioned for line contact sealing engagement.

11. A strip gasket as defined in claim 8 in which said holding portion is of tubular cross section and has side walls that are formed with integral ribs along their inside surfaces in reinforcing relation to the locations at which the distal edges of the side walls of the strip gasket are attached to said holding portion.

12. A strip gasket of uniform section made of resilient deformable material for sealing the joint between the frame and door members of a refrigerator cabinet or the like, said gasket comprising in a normal unstressed condition an elongated base portion, an elongated holding portion adapted to carry magnetic means and extending longitudinally of said base portion in spaced relation thereto, and two spaced side walls extending between and fixed to said base portion and said holding portion normally resiliently supporting said holding portion in spaced relation from said base portion and providing the only support for said holding portion from said base portion, said side walls in cross section having the shapes of smooth compound curves with portions adjacent the base portion curved with concave surfaces in facing relation and with parts adjacent said holding portion curved with concave surfaces facing said base portion, said side walls having distal edges attached to said holding portion that are spaced substantially nearer to said base portion than said curved parts, each of said side walls being tapered from the base portion to its curved part adjacent the holding portion, said side walls being substantially more flexible than said base portion but sufficiently stiff resiliently to support said holding portion in spaced relation a substantial distance from said base portion when said sealing strip is mounted for use and is uncompressed.

References Cited in the file of this patent

UNITED STATES PATENTS

| | | |
|---|---|---|
| 139,978 | Snyder | June 17, 1873 |
| 2,198,838 | Peltier | Apr. 30, 1940 |
| 2,345,273 | Macklanburg | Mar. 28, 1944 |
| 2,471,635 | Mark et al. | May 31, 1949 |
| 2,659,118 | Anderson et al. | Nov. 17, 1953 |
| 2,908,949 | Frehse | Oct. 20, 1959 |
| 2,958,912 | Bower et al. | Nov. 8, 1960 |
| 3,025,576 | Herman | Mar. 20, 1962 |
| 3,075,258 | Petkwitz | Jan. 29, 1963 |